(No Model.)
L. GIBBS.
LAWN RAKE.
No. 385,751. Patented July 10, 1888.
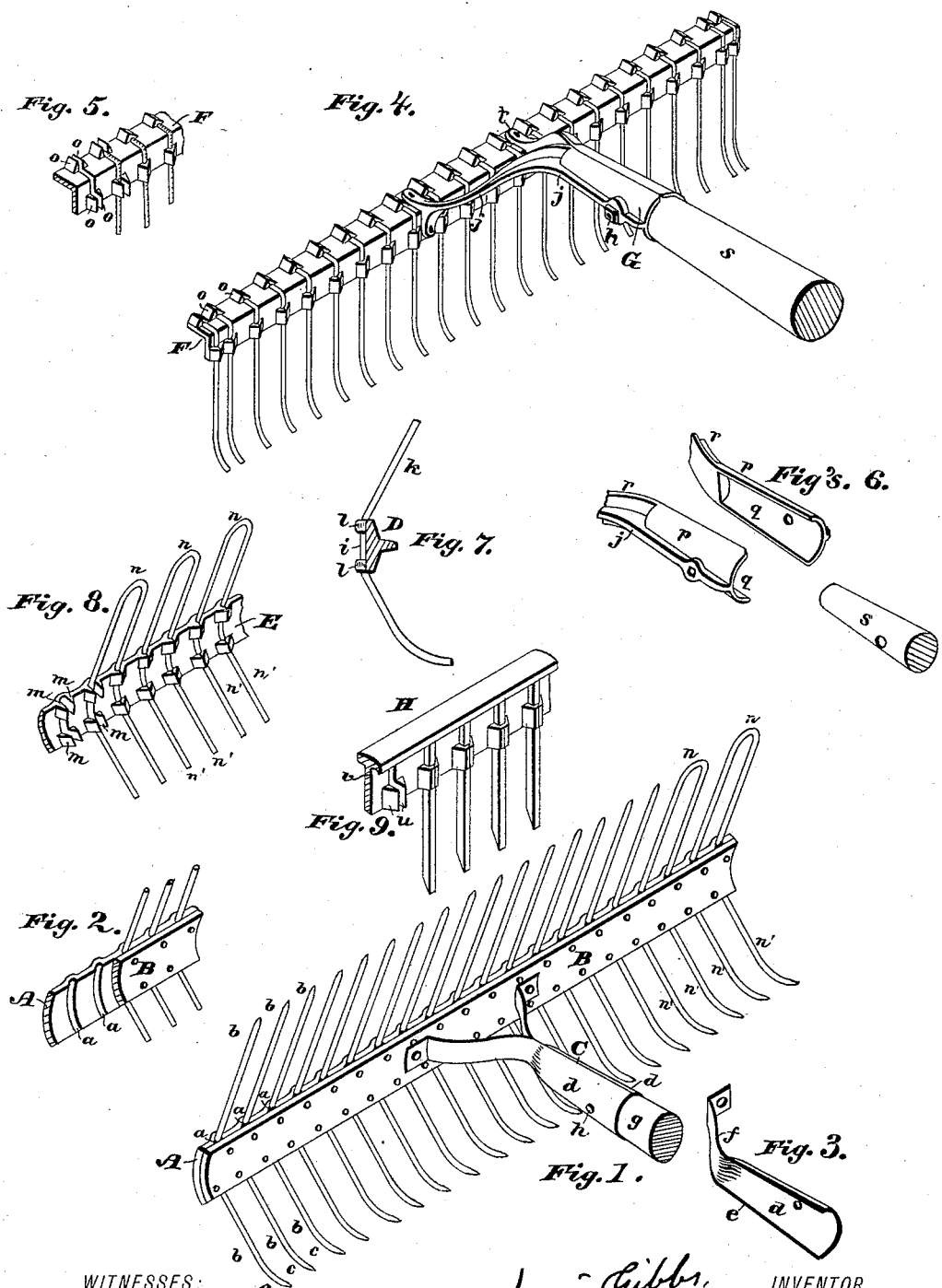
WITNESSES: INVENTOR,
Harry Frease Lewis Gibbs.
Chas. R. Miller BY
W. K. Miller.
ATTORNEY,
N. PETERS. Photo-Lithographer, Washington, D. C.

UNITED STATES PATENT OFFICE.

LEWIS GIBBS, OF CANTON, OHIO.

LAWN-RAKE.

SPECIFICATION forming part of Letters Patent No. 385,751, dated July 10, 1888.

Application filed March 17, 1887. Serial No. 231,246. (No model.)

*To all whom it may concern:*

Be it known that I, LEWIS GIBBS, a citizen of the United States, and a resident of Canton, county of Stark, State of Ohio, have invented a new and useful Improvement in Lawn-Rakes, of which the following is a full, clear, and exact description, reference being had to the accompanying drawings, making part of this specification.

My invention relates to improvements in lawn-rakes; and it consists in providing the hereinafter-described forms of rake heads and rake-teeth and handle-socket.

My invention also relates to the detail of parts and to the combination of parts, as described, and set forth in the claims.

Figure 1 is a view in perspective of a lawn rake embodying my invention. Fig. 2 is a view of a portion of rake head, partly sectional, showing transverse grooves. Fig. 3 is a view in perspective of one-half of handle-socket. Fig. 4 is a view in perspective showing another method of forming a rake. Fig. 5 is same view of a portion of the head, showing the clinch-fingers. Fig. 6 is a view in perspective showing the handle-socket. Fig. 7 is a sectional view of another form of metal rake-head. Fig. 8 is a view of a portion of a concavo-convex metal rake head, showing the manner of fastening teeth. Fig. 9 is a view in perspective showing a portion of a metal head for garden-rake and the manner of fastening the teeth thereto.

Similar letters of reference indicate corresponding parts in all of the figures of the accompanying drawings.

As shown in Fig. 1, letter A represents the back piece of the rake-head, which may be made of any suitable sheet metal, preferably of steel, and is of the form substantially as shown in the drawings, having in transverse section a concave front and convex back, and is provided at desired intervals with transverse grooves $a$, as shown in Fig. 2, for the reception of the teeth $b$. Said back piece is formed in dies consisting of two parts, which coact to give the piece swaged between them the form shown in Figs. 1 and 2. The tooth $b$ (shown in Fig. 1) is made of a single piece of suitable-sized wire, the middle section bent to conform to the groove $a$ in the back piece of the head, the ends of said teeth pointed and inclined forward transversely, so that when one end is used as a rake the other end will form a hood to prevent the cut grass from passing over the head. One end of the teeth on one side of the head is curved, as shown by letter $c$, forming a shoe or runner by which the point of the tooth may be carried above the roots of the grass. The other end is straight, to be used when more severe raking is required or for garden purposes.

The front piece, B, is made of plate-steel similar to the back and is formed concavo-convex in transverse section, the convex or back part adapted to the concave or front of the back piece, A. The teeth $b$ are placed in the grooves $a$, as shown, the front piece, B, placed on the teeth, and the two parts A and B riveted or bolted together, forming a light, rigid, and durable rake head.

The handle-socket C is made of sheet-steel, formed in duplicate parts $d\,d$, which are formed in dies consisting of two parts, which coact to give the piece $d$ the form shown in Fig. 3, having a conical socket portion, $e$, concavo-convex in transverse section, said conical socket portion terminating in a diverging shank, $f$, the free end of which is adapted to be riveted or bolted to the rake-head, as shown in Fig. 1, the two parts $d\,d$ forming a well-braced socket for the handle $g$, which is secured in position by the bolt $h$.

The tooth $k$ shown in Fig. 7 is similar to that shown in Figs. 1 and 2. The only difference is that the middle section, $i$, of the tooth $k$ is straight to adapt it to the T-shaped head D. Said head is made of cast malleable iron in the form substantially as shown by the transverse section Fig. 7, and is provided with a series of clinch-fingers, $l$, set in two rows and in pairs at such intervals as may be desired. The teeth are placed between each pair of fingers, which are then clinched down over the wire forming the teeth, thus securing the teeth to the head.

In Fig. 8 is shown a rake-head, E, made of cast malleable iron, and is in form concavo-convex in transverse section, having on its front or concave side a series of clinch-fingers, $m$, in pairs and in two rows at proper intervals to receive the U-shaped tooth $n$, the prongs $n'$ of which are parallel and pass between the pairs of clinch-fingers, as shown, when said fingers are clinched down over the wire tooth. The ends of said teeth are inclined transversely from both sides of the head, adapted to form a hood for the rake. This U-shaped tooth $n$ may be used in the rake-head A when that form of tooth is preferred.

In Fig. 4 is shown a rake-head, F, made of cast malleable iron, and is of the form shown, having a series of clinch-fingers, $o$, set in pairs at desired intervals on the front side of said head and a series of clinch-fingers on the top of said head set to coincide with the fingers on the front of said head. The teeth for said head F are formed substantially as shown and may be fastened thereto by placing them between the clinch-fingers, as shown in Fig. 5, and closing or clinching the fingers down over the teeth, as shown in Fig. 1.

The handle-socket G is made of cast malleable iron and formed, as shown, in two parts, $p$, each part having conical semicircular socket $q$, which terminates in a diverging shank-section, $r$, the free ends of which are adapted for connection with the rake-head F. Strengthening-ribs $j$ are provided, extending from near the outer end of the socket to a point near the free end of the shank. The conical end of the handle $s$ is placed in the socket formed by the two parts $p\ p$ and secured therein by the bolt $h$.

The garden-rake head H (shown in Fig. 9) is made of cast malleable iron in the form of a letter T, as shown in the drawings, and is provided with clinch-fingers $u$, set in pairs at desired intervals on its front vertical face. The teeth are made of steel, placed between the fingers, the upper end of the teeth placed in a groove, $v$, provided on the under side of the T-head, and secured by clinching the fingers down over the teeth, as shown.

Having thus fully described the nature and object of my invention, what I claim, and desire to secure by Letters Patent, is—

1. A rake-head formed of two metal plates concavo-convex in cross-section, the concave face of one piece having a series of grooves to receive the teeth, the convex back of the other piece adapted to rest against said teeth, and means for securing said plates in position to secure the teeth in the grooves, substantially as described, and for the purpose set forth.

2. In a lawn-rake, the combination, with a rake-head, of a series of teeth sharp at both ends and inclined transversely from both sides of the head and adapted to form a rake or a hood upon both sides of the rake-head, substantially as shown and described, and for the purpose set forth.

3. In a lawn-rake, the combination, with a rake-head formed of two metal plates concavo-convex in cross-section, of a series of U-shaped teeth extending between the said concavo-convex head-sections, the prongs of said teeth extending on opposite sides of the head, being inclined transversely, and means for securing the head-sections together, and thereby securing the teeth in position, substantially as set forth.

4. A rake-handle socket formed of two duplicate parts made of thin plates of metal, each part having a tapered semicircular socket portion terminating in a shank diverging from the axial line of the socket, the free end of which is adapted for a rivet or bolt connection with the rake-head, and a through-bolt by which the socket portions may be clasped about the conical end of the handle, substantially as shown and described.

5. A rake-handle socket made in two parts, as shown, preferably of cast malleable iron, each part having a tapered socket portion semicircular in cross-section, terminating in a diverging shank, the free end of which is adapted for connection with the head, a rib extending from a point near the outer end of the socket to a point near the free end of the shank, and a through-bolt by which the socket portions may be clasped about the conical end of the handle, substantially as shown and described.

In testimony whereof I have hereunto set my hand this 11th day of March, A. D. 1887.

LEWIS GIBBS.

Witnesses:
CHAS. R. MILLER,
W. K. MILLER.